United States Patent
Takahara et al.

(10) Patent No.: US 7,267,056 B2
(45) Date of Patent: Sep. 11, 2007

(54) INITIATOR

(75) Inventors: Isamu Takahara, Nagoya (JP); Junji Muroi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/509,518

(22) PCT Filed: Mar. 17, 2003

(86) PCT No.: PCT/JP03/03148

§ 371 (c)(1),
(2), (4) Date: Nov. 26, 2004

(87) PCT Pub. No.: WO03/083404

PCT Pub. Date: Oct. 9, 2003

(65) Prior Publication Data

US 2005/0126415 A1   Jun. 16, 2005

(30) Foreign Application Priority Data

Mar. 29, 2002 (JP) .............................. 2002-094994

(51) Int. Cl.
*F42B 3/107* (2006.01)
(52) U.S. Cl. ..................... 102/202.9; 280/741
(58) Field of Classification Search ............ 102/202.7, 102/202.9; 280/741
See application file for complete search history.

(56) References Cited

U.S. PATENT DOCUMENTS

| | | | | |
|---|---|---|---|---|
| 2,921,520 A | * | 1/1960 | Stonestrom | 361/248 |
| 2,986,090 A | | 5/1961 | Doerpinghaus | 102/202.8 |
| 3,096,714 A | | 7/1963 | Yuill | 102/202.11 |
| 5,044,278 A | * | 9/1991 | Campbell | 102/202.8 |
| 5,140,906 A | * | 8/1992 | Little, II | 102/202.14 |
| 5,269,560 A | * | 12/1993 | O'Loughlin et al. | 280/736 |
| 5,621,183 A | * | 4/1997 | Bailey | 102/202.7 |
| 6,305,286 B1 | * | 10/2001 | Fogle et al. | 102/202.5 |
| 6,341,562 B1 | * | 1/2002 | Brisighella | 102/202.14 |

FOREIGN PATENT DOCUMENTS

| | | |
|---|---|---|
| CH | 341 097 | 9/1959 |
| EP | 1 209 436 A1 | 5/2002 |
| JP | A 9-126697 | 5/1997 |
| JP | A 10-47892 | 2/1998 |
| JP | A 11-301402 | 11/1999 |
| JP | A 2000-500856 | 1/2000 |
| JP | A 2000-241099 | 9/2000 |
| JP | A 2001-21293 | 1/2001 |
| WO | WO 98/10236 | 3/1998 |
| WO | WO 01/02793 A1 | 1/2001 |

* cited by examiner

*Primary Examiner*—Stephen M. Johnson
(74) *Attorney, Agent, or Firm*—Oliff & Berridge, PLC

(57) ABSTRACT

An initiator includes, as constitutive components, a pair of electrodes disposed with an insulator disposed therebetween; a bridge wire connected between the pair of electrodes and adapted to generate heat when energized; an explosive which detonates in response to heat generation of the bridge wire; and a casing that hermetically accommodates the bridge wire and the explosive. The insulator includes a step for enhancing the resistance of the insulator to pressure generated through detonation of the explosive when the insulator receives the thus-generated pressure. The step is formed such that the area of the explosive-side pressure reception surface of the insulator is greater than that of the counter-explosive-side pressure reception surface thereof.

13 Claims, 4 Drawing Sheets

INITIATOR

TECHNICAL FIELD

The present invention relates to an initiator to be employed in, for example, an airbag apparatus or a seatbelt pre-tensioner, either of which is to be furnished in a vehicle.

BACKGROUND ART

One of various known types of initiators is constituted by a pair of electrodes joined together via an insulator; a bridge wire connected with these two electrodes and adapted to generate heat when energized; and a casing that hermetically accommodates the bridge wire and an explosive able to detonate in response to heat generation of the bridge wire. This type of initiator is disclosed in, for example, Japanese Patent Application Laid-Open (kokai) Nos. 2000-241099 and H11-301402.

In some cases, the components constituting the aforementioned conventional initiator, such as the electrodes and the insulator, receive high temperature and high pressure generated through detonation of the explosive. Therefore, the constitutive components (e.g., the electrodes and the insulator) are required to have high heat resistance and high pressure resistance. As an inflator for an airbag apparatus has been reduced in size, the pressure of a gas stored in the inflator has been increased. In accordance with this tendency, a load (high temperature and high pressure) applied to an initiator mounted on the inflator has been increased. Therefore, demand has arisen for enhancing the pressure resistance of the initiator.

DISCLOSURE OF THE INVENTION

To solve the above-mentioned problems, according to a first aspect of the present invention, there is provided an initiator comprising as constitutive components: a pair of electrodes disposed with an insulator disposed therebetween; a bridge wire connected between the pair of electrodes and adapted to generate heat when energized; an explosive which detonates in response to heat generation of the bridge wire; and a casing that hermetically accommodates the bridge wire and the explosive, wherein at least one selected component comprises means for enhancing its resistance to pressure generated through detonation of the explosive when the component receives the thus-generated pressure. The resistance enhancing means may be provided on the insulator. Alternatively, the resistance enhancing means may be provided on any of the electrodes.

In the initiator according to the first aspect of the present invention, when a selected component receives pressure generated through detonation of the explosive, the resistance enhancing means provided on the component enhances the resistance of the component to the thus-generated pressure. Therefore, the positional relation between the selected component and an adjacent component is maintained, and damage to the initiator is suppressed.

According to a second aspect of the present invention, there is provided an initiator comprising as constitutive components: a pair of electrodes disposed with an insulator disposed therebetween; a bridge wire connected between the pair of electrodes and adapted to generate heat when energized; an explosive which detonates in response to heat generation of the bridge wire; and a casing that hermetically accommodates the bridge wire and the explosive, wherein at least one selected component comprises means for preventing removal of the component, which removal would otherwise occur by means of pressure generated through detonation of the explosive and applied to the component. The removal prevention means may be provided on the insulator. Alternatively, the removal prevention means may be provided on any of the electrodes.

In the initiator according to the second aspect of the present invention, the removal prevention means provided on a selected component prevents removal of the component, which removal would otherwise occur by means of pressure generated through detonation of the explosive and applied to the component. Therefore, removal of the selected component from an adjacent component is prevented, and damage to the initiator is suppressed.

According to a third aspect of the present invention, there is provided an initiator comprising as constitutive components: a pair of electrodes disposed with an insulator disposed therebetween; a bridge wire connected between the pair of electrodes and adapted to generate heat when energized; an explosive which detonates in response to heat generation of the bridge wire; and a casing that hermetically accommodates the bridge wire and the explosive, wherein at least one selected component comprises means for increasing force with which the component engages an adjacent component (hereinafter the force may be referred to simply as "engagement force") when the selected component receives pressure generated through detonation of the explosive. The engagement force increasing means may be provided on the insulator. Alternatively, the engagement force increasing means may be provided on any of the electrodes.

In the initiator according to the third aspect of the present invention, when a selected component including the engagement force increasing means receives pressure generated through detonation of the explosive, the means increases engagement force of the component against an adjacent component. Therefore, relative movement between the components (removal of the selected component from its mounted position) is prevented, and damage to the initiator is suppressed.

In the initiators according to the first through third aspects of the present invention, any one of the resistance enhancing means, the removal prevention means, and the engagement force increasing means may assume the form of a step provided on a selected component at the boundary between the selected component and an adjacent component, the step being formed such that the area of a surface of the selected component that faces the explosive and receives pressure (hereinafter the surface may be referred to simply as an "explosive-side pressure reception surface") is greater than that of a surface of the selected component opposite the explosive-side pressure reception surface (hereinafter the opposite surface may be referred to as a "counter-explosive-side pressure reception surface"). Alternatively, any one of the aforementioned means may assume the form of a taper surface formed on a selected component at the boundary between the selected component and an adjacent component, the taper surface being formed such that a cross section of the selected component decreases with increasing distance from the explosive. Alternatively, any one of the aforementioned means may assume the form of a knurled portion provided on a selected component at the boundary between the selected component and an adjacent component. Alternatively, any one of the aforementioned means may assume the form of an engaging protrusion provided on a selected component at the boundary between the selected component and an adjacent component. Alternatively, any one of the aforementioned means may assume the form of surface treatment performed on a selected component so as to increase friction force between the selected component and an adjacent component (hereinafter the surface treatment may be referred to simply as "friction-increasing surface treatment"). The aforementioned taper surface or knurled portion may be provided partially on a selected component.

In the initiators according to the first through third aspects of the present invention, simple, inexpensive means, such as a step, a taper surface, a knurled portion, an engaging protrusion, or friction-increasing surface treatment, is provided on a selected component at the boundary between the selected component and an adjacent component. Therefore, damage to the initiators is suppressed.

According to a fourth aspect of the present invention, there is provided an initiator comprising as constitutive components: a pair of electrodes disposed with an insulator disposed therebetween; a bridge wire connected between the pair of electrodes and adapted to generate heat when energized; an explosive which detonates in response to heat generation of the bridge wire; and a casing that hermetically accommodates the bridge wire and the explosive, wherein at least one selected component comprises a portion whose shape is other than a right cylinder (hereinafter called a "non-right-cylindrical portion") at the boundary between the selected component and an adjacent component, the non-right-cylindrical portion receiving reaction force from the adjacent component when the selected component receives pressure generated through detonation of the explosive. The non-right-cylindrical portion may assume the form of a step which is formed such that the area of the explosive-side pressure reception surface of the selected component is greater than that of the counter-explosive-side pressure reception surface of the selected component. Alternatively, the non-right-cylindrical portion may assume the form of a taper surface which is formed such that a cross section of the selected component decreases with increasing distance from the explosive. The non-right-cylindrical portion may be provided on the entirety of the boundary between the selected component and the adjacent component.

In the initiator according to the fourth aspect of the present invention, at least one of the electrodes may be formed of a lead pin, which is coaxially attached to a conductive header via the insulator, the conductive header being jointed with the other electrode and the casing. The selected component having the non-right-cylindrical portion may be the insulator, and the adjacent component may be the conductive header. Alternatively, the selected component having the non-right-cylindrical portion may be the lead pin, and the adjacent component may be the insulator.

In the initiator according to the fourth aspect of the present invention, when a selected component receives pressure generated through detonation of the explosive, the non-right-cylindrical portion (e.g., a step or a taper surface) provided on the selected component at the boundary between the selected component and an adjacent component receives reaction force from the adjacent component. Therefore, the positional relation between the selected component and the adjacent component is maintained, and damage to the initiator is suppressed.

BEST MODE FOR CARRYING OUT THE INVENTION

Figure 1:
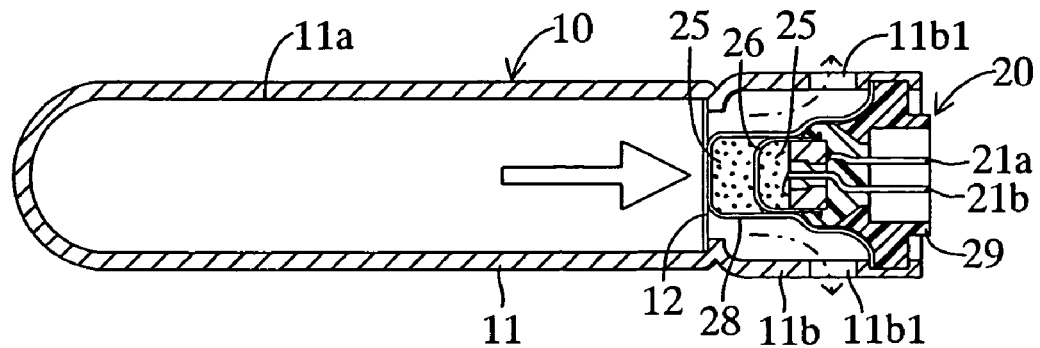
FIG. 1 is a cross-sectional view showing an inflator for an airbag apparatus incorporating an initiator of the present invention.

An embodiment of the present invention will now be described with the drawings. FIG. 1 shows an inflator 10 for an airbag apparatus to be mounted in a vehicle, the inflator 10 incorporating an initiator 20 according to the present invention. The inflator 10 of the present embodiment includes a casing 11 and a gas sealing lid 12 mounted in an airtight manner in the casing 11. The casing 11 has a gas storage portion 11a, in which a high-pressure gas is enclosed, and an attachment portion 11b to which the initiator 20 is attached. The gas sealing lid 12 can be broken through detonation of the initiator 20.

When the gas sealing lid 12 is not broken as shown in FIG. 1, a high-pressure gas is accommodated in the gas storage portion 11a of the casing 11. When the gas sealing lid 12 is broken upon detonation of the initiator 20, as shown by two-dot chain arrows of FIG. 1, the high-pressure gas spurts out of the gas storage portion 11a of the casing 11 toward an airbag (not shown) via outflow openings 11b1 formed in the attachment portion 11b.

Figure 2:
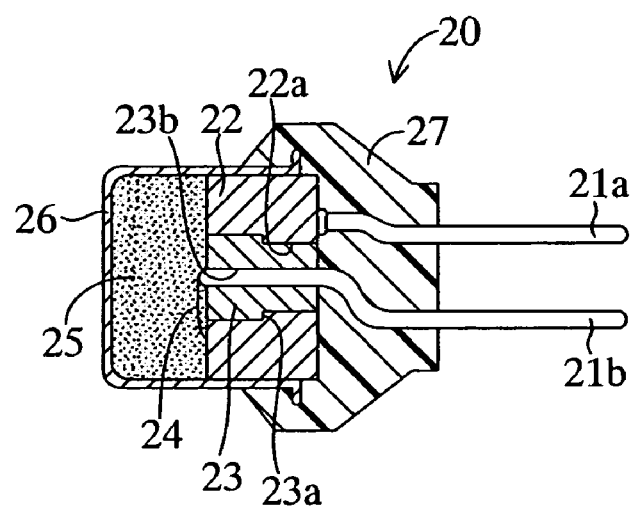
FIG. 2 is an enlarged cross-sectional view showing an essential portion of the initiator shown in FIG. 1.

Meanwhile, the initiator 20 includes a plurality of components shown, on an enlarged scale, in FIG. 2; e.g., a pair of lead pins 21a and 21b, a conductive header 22, an insulator 23, a bridge wire 24, an explosive 25, a casing 26, and a resin mold 27. Auxiliary components; e.g., a metallic holder 28 and a resin holder 29 are used to mount the initiator 20 in the inflator 10 as shown in FIG. 1.

The lead pin 21a serving as an electrode is attached to the conductive header 22. The lead pin 21b serving as an electrode is attached to the conductive header 22 via the insulator 23. The conductive header 22 is formed of a conductive metal and has a cylindrical tubular shape. The conductive header 22 has a stepped hole 22a along its center axis. The diameter of an explosive-side portion of the hole 22a is greater than that of the remaining portion.

The insulator 23 assumes a cylindrical shape and has an annular stepped portion (step) 23a on its circumference. The insulator 23 has an insertion hole 23b extending along its center axis, to which the lead pin 21b is tightly fitted and coaxially secured. The insulator 23 is formed of heat- and pressure-resistant glass, and is tightly fitted and coaxially secured to the hole 22a of the conductive header 22. The step 23a is formed such that the area of the explosive-side pressure reception surface of the insulator 23 is greater than that of the counter-explosive-side pressure reception surface thereof. The step 23a is a non-right-cylindrical portion. The size and number of the step 23a may be appropriately determined in accordance with the pressure resistance required for the insulator 23.

The bridge wire 24 is connected between the lead pin 21b and the conductive header 22; i.e., the bridge wire 24 is connected directly to the lead pin 21b, and indirectly to the lead pin 21a via the conductive header 22. When energized via the lead pins 21a and 21b, the bridge wire 24 generates heat to thereby cause the explosive 25 to detonate. The explosive 25, together with the bridge wire 24, is accommodated in a leak-proof state within the casing 26, and the explosive 25 comes in partial contact with the bridge wire 24.

The casing 26 is formed of a thin metal sheet and has a cup shape whose bottom is breakable upon detonation of the explosive 25. As shown in FIG. 1, the open end of the casing 26 is fitted to the circumference of the conductive header 22 and fixedly joined therewith in an airtight state by welding or other means. The resin mold 27 is formed through molding to integrally join the individual components; e.g., the lead pins 21a and 21b, the conductive header 22, the insulator 23, and the casing 26.

The metallic holder 28 is formed of a metal sheet and has a cup shape. As shown in FIG. 1, the metallic holder 28 mounted in the casing 11 extends to the gas sealing lid 12 such that a blast generated upon detonation of the explosive 25 strikes the center portion of the gas sealing lid 12, thereby breaking the center portion first, and eventually the entirety of the gas sealing lid 12 is broke.

The resin holder 29 is formed through molding in order to cover the initiator 20 assembled to the metallic holder 28. As shown in FIG. 1, the resin holder 29 is assembled to the casing 11 together with the metallic holder 28. As shown in FIG. 1, the explosive 25 is hermetically accommodated in the metallic holder 28, and the explosive 25 in the metallic holder 28 detonates upon detonation of the explosive 25 in the casing 26.

In the initiator 20 of the present embodiment having the aforementioned configuration, the step 23a of the insulator 23 (i.e., a non-right-cylindrical portion provided at a boundary between the insulator 23 and the conductive header 22) engages the step of the stepped hole 22a of the conductive header 22. When the insulator 23 receives pressure generated through detonation of the explosive 25, the step 23a serves as means for enhancing the resistance of the insulator 23 to the thus-generated pressure, and the insulator 23 receives reaction force from the conductive header 22. Therefore, the pressure resistance of the insulator 23 is enhanced, and the positional relation between the insulator 23 and the conductive header 22 is maintained, whereby damage to the initiator 20 is suppressed.

In the initiator 20 of the present embodiment, the step 23a of the insulator 23 serves as means for preventing removal of the insulator 23, which removal would otherwise occur by means of pressure generated through detonation of the explosive 25 and applied to the insulator 23. Therefore, the pressure resistance of the insulator 23 is enhanced, and removal of the insulator 23 from the conductive header 22 is prevented, whereby damage to the initiator 20 is suppressed.

In the initiator 20 of the present embodiment, the step 23a of the insulator 23 engages the step of the stepped hole 22a of the conductive header 22. When the insulator 23 receives pressure generated through detonation of the explosive 25, the step 23a serves as means for increasing engagement force between the insulator 23 and the conductive header 22. Therefore, the pressure resistance of the insulator 23 is enhanced, and relative movement between the insulator 23 and the conductive header 22 is prevented, whereby damage to the initiator 20 is suppressed.

As shown in FIGS. 1 and 2, in the initiator 20 of the present embodiment, the step 23a of the insulator 23 engages the step of the stepped hole 22a of the conductive header 22. However, as shown in FIGS. 3 through 13, the shape of any of the components of the initiator 20 may be varied. In each of the below-described modifications of the initiator 20, merely the shape-varied portion of any of the components of the initiator 20 will be described, the components whose shapes are not varied are denoted by the same reference numerals as described above, and repeated description is omitted.

Figure 3:
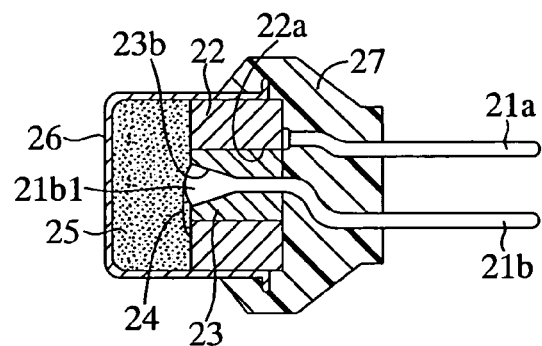
FIG. 3 is a cross-sectional view showing a first modification of the initiator shown in FIG. 2.

In a first modification shown in FIG. 3, a section 21b1 of the lead pin 21b secured to the insertion hole 23b of the insulator 23 of the initiator 20 (the section 21b1 accounts for about half a portion of the lead pin 21b joined with the insulator 23, and the length of the section 21b1 may be appropriately determined in accordance with the pressure resistance required for the lead pin 21b) has a taper surface which is formed such that a cross section of the section 21b1 decreases with increasing the distance from the explosive 25 (the taper angle may be appropriately determined in accordance with the pressure resistance required for the lead pin 21b). A section of the insertion hole 23b of the insulator 23, which section accounts for about half the insertion hole 23b, has a taper surface which is formed such that a cross section of the insertion hole 23b decreases with increasing distance from the explosive 25.

Therefore, in the first modification shown in FIG. 3, the engagement configuration at the boundary between the lead pin 21b and the insulator 23 is envisaged to provide effects similar to those provided by the step at the boundary between the conductive header 22 and the insulator 23 of the embodiment shown in FIGS. 1 and 2. In the first modification, the insulator 23 assumes a cylindrical shape and has no step on its circumference, and the insulator 23 is tightly fitted and coaxially secured to a cylindrical hole 22a of the conductive header 22.

Figure 4:
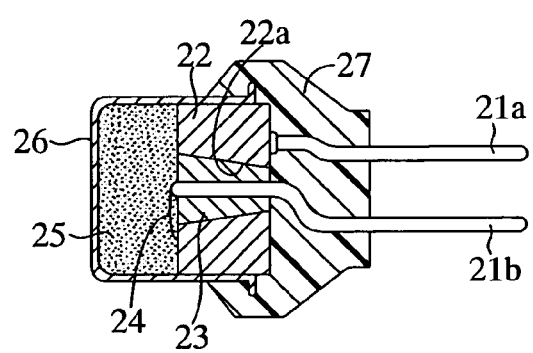
FIG. 4 is a cross-sectional view showing a second modification of the initiator shown in FIG. 2.

In a second modification shown in FIG. 4, the entire circumference of the insulator 23 of the initiator 20 has a taper surface which is formed such that a cross section of the insulator 23 decreases with increasing distance from the explosive 25 (the taper angle may be appropriately determined in accordance with the pressure resistance required for the insulator 23). The cylindrical hole 22a of the conductive header 22 has a taper surface which is formed such that a cross section of the hole 22a decreases with increasing distance from the explosive 25.

Therefore, in the second modification shown in FIG. 4, the engagement configuration at the boundary between the conductive header 22 and the insulator 23 is envisaged to provide effects similar to those provided by the step at the boundary between the conductive header 22 and the insulator 23 of the embodiment shown in FIGS. 1 and 2. In the second modification, the length of the boundary between the conductive header 22 and the insulator 23 may be appropriately determined in accordance with the pressure resistance required for the insulator 23.

Figure 5:
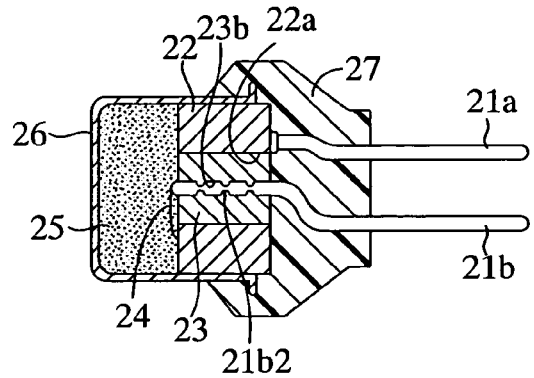
FIG. 5 is a cross-sectional view showing a third modification of the initiator shown in FIG. 2.

In a third modification shown in FIG. 5, a plurality of annular grooves 21b2 are formed on the lead pin 21b secured to the insertion hole 23b of the insulator 23 of the initiator 20 (the size and number of the grooves 21b2 may be appropriately determined in accordance with the pressure resistance required for the lead pin 21b). In addition, protrusions which are fitted into the annular grooves 21b2 are formed on the insertion hole 23b of the insulator 23.

Therefore, in the third modification shown in FIG. 5, the engagement configuration at the boundary between the lead pin 21b and the insulator 23 is envisaged to provide effects similar to those provided by the step at the boundary between the conductive header 22 and the insulator 23 of the embodiment shown in FIGS. 1 and 2. In the third modification, the insulator 23 assumes a cylindrical shape and has no step on its circumference, and the insulator 23 is tightly fitted and coaxially secured to the cylindrical hole 22a of the conductive header 22.

Figure 6:
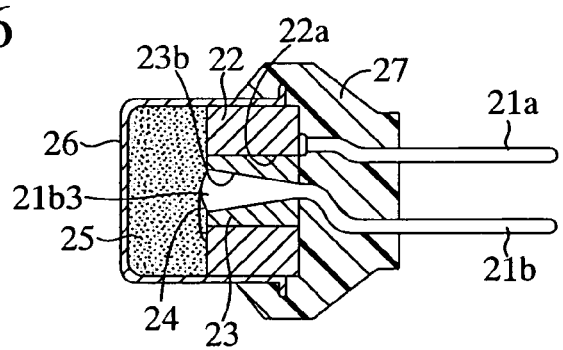
FIG. 6 is a cross-sectional view showing a fourth modification of the initiator shown in FIG. 2.

In a fourth modification shown in FIG. 6, the entirety of a portion 21b3 of the lead pin 21b secured to the insertion hole 23b of the insulator 23 of the initiator 20 (i.e., the entirety of the boundary between the lead pin 21b and the insulator 23) has a taper surface which is formed such that a cross section of the portion 21b3 decreases with increasing distance from the explosive 25 (the taper angle may be appropriately determined in accordance with the pressure resistance required for the lead pin 21b). The entirety of the insertion hole 23b of the insulator 23 has a taper surface which is formed such that a cross section of the hole 23b decreases with increasing distance from the explosive 25.

Therefore, in the fourth modification shown in FIG. 6, the engagement configuration at the boundary between the lead pin 21b and the insulator 23 is envisaged to provide effects similar to those provided by the step at the boundary between the conductive header 22 and the insulator 23 of the embodiment shown in FIGS. 1 and 2. In the fourth modification, the insulator 23 assumes a cylindrical shape and has no step on its circumference, and the insulator 23 is tightly fitted and coaxially secured to the cylindrical hole 22a of the conductive header 22.

Figure 7:
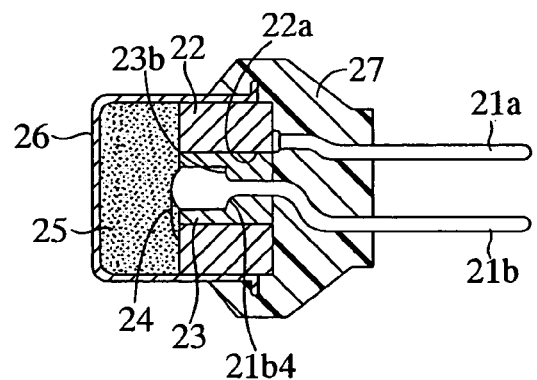
FIG. 7 is a cross-sectional view showing a fifth modification of the initiator shown in FIG. 2.

In a fifth modification shown in FIG. 7, a step 21b4, in which the area of the explosive-side pressure reception surface is greater than that of the counter-explosive-side pressure reception surface, is formed on the lead pin 21b secured to the insertion hole 23b of the insulator 23 of the initiator 20 (the size and number of the step 21b4 may be appropriately determined in accordance with the pressure resistance required for the lead pin 21b). In addition, a step corresponding to the step 21b4 is formed on the insertion hole 23b of the insulator 23.

Therefore, in the fifth modification shown in FIG. 7, the engagement configuration at the boundary between the lead pin 21b and the insulator 23 is envisaged to provide effects similar to those provided by the step at the boundary between the conductive header 22 and the insulator 23 of the embodiment shown in FIGS. 1 and 2. In the fifth modification, the insulator 23 assumes a cylindrical shape and has no step on its circumference, and the insulator 23 is tightly fitted and coaxially secured to the cylindrical hole 22a of the conductive header 22.

Figure 8:
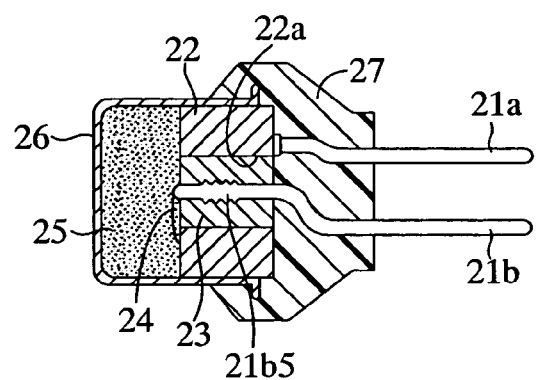
FIG. 8 is a cross-sectional view showing a sixth modification of the initiator shown in FIG. 2.

In a sixth modification shown in FIG. 8, a knurled portion 21b5 is formed on the lead pin 21b secured to the insertion hole 23b of the insulator 23 of the initiator 20 (the pitch and depth of grooves of the knurled portion 21b5 and the axial length of the knurled portion 21b5 may be appropriately determined in accordance with the pressure resistance required for the lead pin 21b). In addition, protrusions which are fitted into the grooves of the knurled portion for increasing the area of contact between the protrusions and the grooves are formed on the insertion hole 23b of the insulator 23.

Therefore, in the sixth modification shown in FIG. 8, the engagement configuration at the boundary between the lead pin 21b and the insulator 23 is envisaged to provide effects similar to those provided by the step at the boundary between the conductive header 22 and the insulator 23 of the embodiment shown in FIGS. 1 and 2. In the sixth modification, the insulator 23 assumes a cylindrical shape and has no step on its circumference, and the insulator 23 is tightly fitted and coaxially secured to the cylindrical hole 22a of the conductive header 22.

Figure 9:
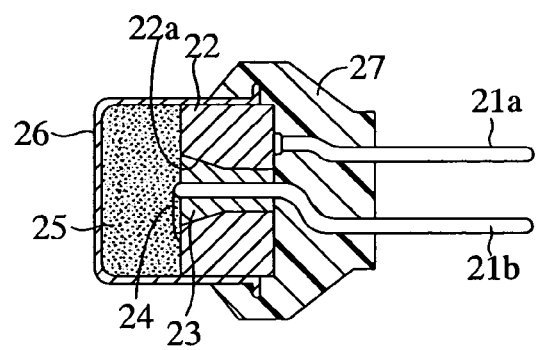
FIG. 9 is a cross-sectional view showing a seventh modification of the initiator shown in FIG. 2.

In a seventh modification shown in FIG. 9, an explosive-side portion of the insulator 23 of the initiator 20 (the portion accounts for about half the insulator 23, and the length of the portion may be appropriately determined in accordance with the pressure resistance required for the insulator 23) has a taper surface which is formed such that a cross section of the portion decreases with increasing distance from the explosive 25. A corresponding portion of the cylindrical hole 22a of the conductive header 22, which portion accounts for about half the hole 22a, has a taper surface which is formed such that a cross section of the hole 22a decreases with increasing distance from the explosive 25.

Therefore, in the seventh modification shown in FIG. 9, the engagement configuration at the boundary between the conductive header 22 and the insulator 23 is envisaged to provide effects similar to those provided by the step at the boundary between the conductive header 22 and the insulator 23 of the embodiment shown in FIGS. 1 and 2.

Figure 10:
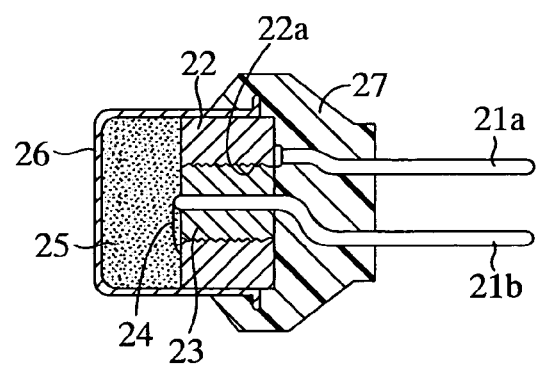
FIG. 10 is a cross-sectional view showing an eighth modification of the initiator shown in FIG. 2.

In an eighth modification shown in FIG. 10, a knurled portion is formed on the entire circumference of the insulator 23 of the initiator 20 (the pitch and depth of grooves of the knurled portion may be appropriately determined in accordance with the pressure resistance required for the insulator 23). In addition, protrusions which are fitted into the grooves of the knurled portion for increasing the area of contact between the protrusions and the grooves are formed on the cylindrical hole 22a of the conductive header 22.

Therefore, in the eighth modification shown in FIG. 10, the engagement configuration at the boundary between the conductive header 22 and the insulator 23 is envisaged to provide effects similar to those provided by the step at the boundary between the conductive header 22 and the insulator 23 of the embodiment shown in FIGS. 1 and 2.

Figure 11:
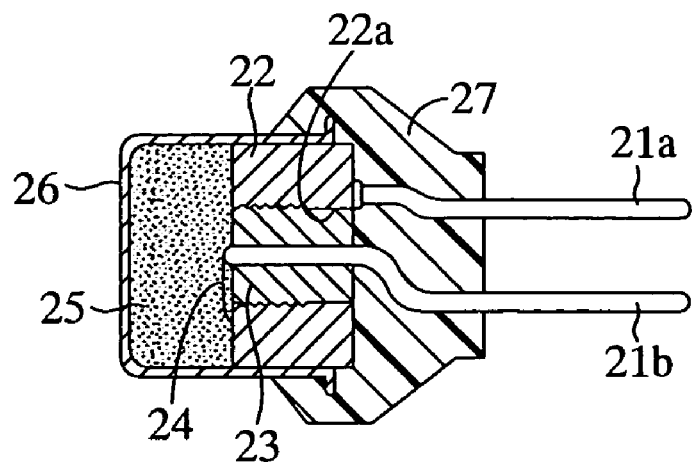
FIG. 11 is a cross-sectional view showing a ninth modification of the initiator shown in FIG. 2.

In a ninth modification shown in FIG. 11, a knurled section is formed on an explosive-side portion of the circumference of the insulator 23 of the initiator 20, the portion accounting for about half the entire circumference of insulator 23 (the pitch and depth of grooves of the knurled section and the axial length of the knurled section may be appropriately determined in accordance with the pressure resistance required for the insulator 23). In addition, protrusions which are fitted into the grooves of the knurled section for increasing the area of contact between the protrusions and the grooves are formed on the cylindrical hole 22a of the conductive header 22.

Therefore, in the ninth modification shown in FIG. 11, the engagement configuration at the boundary between the conductive header 22 and the insulator 23 is envisaged to provide effects similar to those provided by the step at the boundary between the conductive header 22 and the insulator 23 of the embodiment shown in FIGS. 1 and 2.

Figure 12:
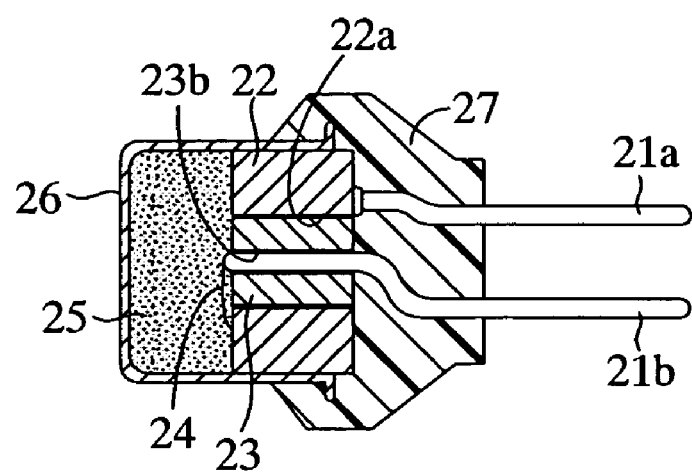
FIG. 12 is a cross-sectional view showing a tenth modification of the initiator shown in FIG. 2.

In a tenth modification shown in FIG. 12, surface treatment (e.g., plating or matting) is performed on the wall of the insertion hole 23b of the insulator 23 of the initiator 20 or on the surface of the lead pin 21b, so as to increase friction force between the insulator 23 and the lead pin 21b. In addition, surface treatment (e.g., plating with a highly adhesive material, or treatment for enhancing surface roughness) is performed on the circumference of the insulator 23 or on the wall of the hole 22a of the conductive header 22, so as to increase friction force between the conductive header 22 and the insulator 23.

Therefore, in the tenth modification shown in FIG. 12, the engagement configuration at the boundary between the lead pin 21b and the insulator 23, as well as that at the boundary between the conductive header 22 and the insulator 23, is envisaged to provide effects similar to those provided by the step at the boundary between the conductive header 22 and the insulator 23 of the embodiment shown in FIGS. 1 and 2. In the tenth modification, the insulator 23 assumes a cylindrical shape and has no step on its circumference, and the insulator 23 is tightly fitted and coaxially secured to the cylindrical hole 22a of the conductive header 22.

Figure 13:
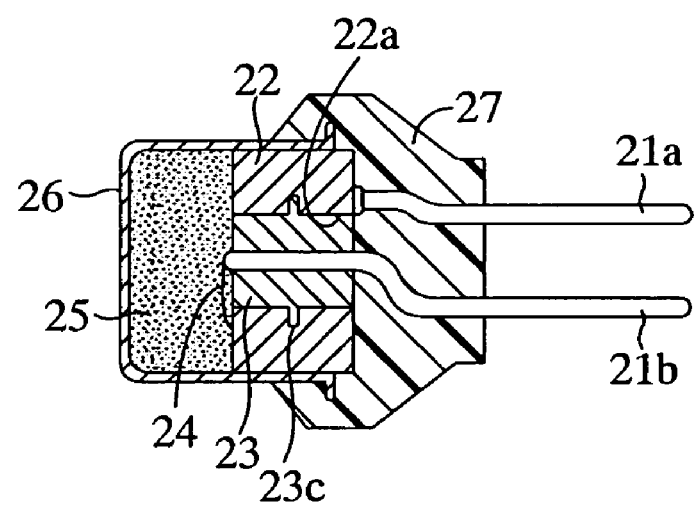
FIG. 13 is a cross-sectional view showing an eleventh modification of the initiator shown in FIG. 2.

In an eleventh modification shown in FIG. 13, an engaging protrusion 23c, which projects outward, is formed on a center portion of the circumference of the insulator 23 of the initiator 20 (the size and number of the protrusion 23c may be appropriately determined in accordance with the pressure resistance required for the insulator 23). In addition, a depression into which the engaging protrusion 23c is fitted is formed on the cylindrical hole 22a of the conductive header 22.

Therefore, in the eleventh modification shown in FIG. 13, the engagement configuration at the boundary between the conductive header 22 and the insulator 23 is envisaged to provide effects similar to those provided by the step at the boundary between the conductive header 22 and the insulator 23 of the embodiment shown in FIGS. 1 and 2.

In the above-described embodiment, the initiator 20 of the present invention is employed in the inflator 10 which is for use in an airbag apparatus and is equipped with the casing 11 and the gas sealing lid 12. Alternatively, the initiator of the present invention may be employed in another type of inflator (e.g., an inflator equipped with a casing containing a gas generating agent which generates gas upon combustion) or another type of apparatus (e.g., a seatbelt pre-tensioner). In the present invention, for example, the embodiment shown in FIG. 2 (i.e., pressure resistance is enhanced by means of the engagement configuration at the boundary between the conductive header 22 and the insulator 23) may be employed in combination with the modification shown in FIG. 8 (i.e., pressure resistance is enhanced by means of the engagement configuration at the boundary between the lead pin 21b and the insulator 23).

In each of the aforementioned embodiment and modifications, a step, a taper surface, a knurled portion, or other means is provided at the boundary between the lead pin 21b and the insulator 23, or at the boundary between the conductive header 22 and the insulator 23, so as to form a non-right-cylindrical portion at the boundary. So long as the portion assumes a shape other than a right cylinder, the boundary may contain a curved portion.

The invention claimed is:

1. An initiator, comprising:
   a conductive header formed from a conductive metal into a tubular shape;
   a first lead pin integrally assembled to the conductive header;
   a second lead pin integrally assembled to a hole formed in the conductive header via an insulating member and penetrating the conductive header and the insulating member;
   a bridge wire connected between an inner end of the second lead pin and an inner end of the conductive head and generating heat upon supply of electricity thereto; and
   a cup-shaped casing airtightly fixed, at an open end portion, to an outer circumference of the conductive header and accommodating, in a sealed condition, the bridge wire and an explosive which detonates in response to heat generation of the bridge wire, wherein the hole of the conductive header and the insulating member fitted into the hole have respective taper portions in a region where the insulating member is joined to the conductive header, the taper portions have diameters that decrease with increasing distance from the explosive, and the taper portions are provided continuously over the entire region where the insulating member is joined to the conductive head.

2. The initiator according to claim 1, wherein the insulating member is formed of heat- and pressure-resistant glass.

3. The initiator according to claim 1, wherein the insulating member is formed of heat- and pressure-resistant glass.

4. An airbag apparatus mounted in a vehicle comprising the initiator according to claim 1.

5. A seatbelt pre-tensioner comprising the initiator according to claim 1.

6. The initiator according to claim 1, wherein a knurled portion is formed on the second lead pin.

7. The initiator according to claim 1, wherein a plurality of protrusions and grooves are formed on the second lead pin.

8. The initiator according to claim 7, wherein a plurality of protrusions and grooves are formed on a hole of the insulating member.

9. An inflator equipped with a casing containing a gas generating agent which generates gas upon combustion comprising the initiator according to claim 1.

10. An inflator of an airbag apparatus, the inflator comprising:
    a casing, the casing comprising:
      a gas storage portion; and
      an attachment portion;
    a gas sealing lid airtightly mounted in the casing; and
    the initiator according to claim 1, the initiator being attached to the attachment portion of the casing.

11. A method of inflating an inflator, the method comprising:
    energizing the initiator according to claim 1;
    generating heat to the bridge wire upon energization of the initiator;
    detonating the explosive in response to heat generated by the bridge wire; and
    breaking the cup-shaped casing upon detonation of the explosive.

12. The method according to claim 11, wherein the inflator defines an airbag apparatus mounted in a vehicle.

13. The method according to claim 11, wherein the inflator defines a seatbelt pre-tensioner.

* * * * *